United States Patent Office

Re. 27,749
Reissued Sept. 11, 1973

27,749

METHOD OF MAKING SOFTENED FABRICS

Leonard D. Kurtz, Woodmere, N.Y., assignor to Sutures, Inc., Coventry, Conn.

No Drawing. Original No. 3,379,091, dated Apr. 23, 1968, Ser. No. 366,187, May 8, 1964, which is a continuation-in-part of Ser. No. 220,085, Aug. 28, 1962, Ser. No. 230,284, Oct. 12, 1962, Ser. No. 312,328, Sept. 30, 1963, and Ser. No. 323,891, Nov. 15, 1963. Application for reissue Aug. 17 1970, Ser. No. 64,584
Int. Cl. D04c *1/06*
U.S. Cl. 87—1 4 Claims

Matter enclosed in heavy brackets [ ] appears in the original patent but forms no part of this reissue specification; matter printed in italics indicates the additions made by reissue.

This application is a continuation-in-part of application Ser. No. 220,085, filed Aug. 28, 1962, now abandoned; application Ser. No. 230,284, filed Oct. 12, 1962, now abandoned; application Ser. No. 312,328, filed Sept. 30, 1963, now U.S. Patent No. 3,307,971; and application Ser. No. 323,891, filed Nov. 15, 1963, now U.S. Patent No. 3,379,552.

The present invention relates to a method of fabricating pliable materials. More particularly, the invention relates to a method of fabricating very pliable or softened threads of polyester and even more particularly to the fabrication of [every] *very* pliable or softened sutures.

As is more fully discussed in my copending application Ser. No. 220,085, filed Aug. 28, 1962, braided polyester threads, for example braided polyethylene terephthalate fibers, have certain physical and chemical properties superior to naturally occurring fibres for many applications. For example, the threads of braided polyethylene terephthalate fibres are suitable for use as surgical sutures, but the thread is stiff relative to, for example, silk or equal tensile strength and/or diameter. This lack of pliability causes the knotting characteristics of the braided thread to be quite poor. The inventions disclosed in the forementioned application and those disclosed in my copending applications Ser. No. 230,284, filed Oct. 12, 1962, Ser. No. 312,328, filed Sept. 30, 1963 and Ser. No. 323,-891, filed Nov. 15, 1963 all had an object to improve the characteristics of polyester threads.

It is more suitable to use a polyfilamentous thread, as opposed to a single filament thread, in order to keep stiffness to a minimum. The monofilament fiber has a cross-section which cannot be varied, i.e., the cross-section is frozen and in a fixed relationship to adjacent cross-sections. An attempt to change the curvature of the thread is resisted by the frozen cross-section which cannot have displacement of its components to accommodate the change. Polyfilamentous materials, on the other hand, can have displacement of the fibers thus accommodating the stress of curvature. Polyfilamentous polyester materials, however, are quite stiff relative to, e.g. silk.

It is an object of the present invention to provide a method of fabricating polyfilamentous materials having maximum flexibility and pliability.

It is a further object of the present invention to provide a method of fabricating braided polyester threads having the aforementioned properties.

These and other objects which will become obvious in view of the following description of a preferred embodiment, are achieved, according to the present invention, by hot stretching individual thread components prior to fabricating those components into a polyfilamentous material.

In order to reduce the elasticity and memory (tendency to return to original length) of a polyester thread to make the thread suitable for certain uses, it is necessary to hot-stretch the thread at a temperature above its glass transition temperature, which will permit a change in configuration without the introduction of internal stresses. Conveniently, the thread may be heated to its softening point. Tension is applied to the heated thread such that the thread is stretched, for example, up to its breaking point. Elongations of over 10% and particularly from about 20% up to, but not including, the breaking point are suitable for preparing surgical sutures of polyester. Such polyester thread, however, has been quite stiff, and despite my aforementioned disclosures relating to improving the properties of the thread, the resultant braided threads are quite stiff relative to silk.

This fundamental stiffness was considered to inhere in the nature of the fibre material, but, quite surprisingly, I have found that the stiffness can be markedly reduced by the simple expedient of hot-stretching individual fibre components before fabricating the individual components into a polyfilamentous material. This result is illustrated in the following examples which constitutes a preferred embodiment of performing my invention.

Example I

A 5/0 surgical polyester (polyethylene terephthalate) suture braided from eight strands of 30 denier threads having a slight twist on a New England Butt braider was hot stretched under tension on platens heated to 450° F. to an elongation of approximately 50%. The control thread so prepared was quite stiff.

Eight individual threads of 30 denier were individually hot stretched under the same conditions as aforesaid to approximately 50% elongation and then braided on the same braiding machine. The product showed little, if any, stiffness and compared with the control, can be described as flaccid. While both methods yielded threads of equivalent diameter, tensile strength and elongation, the latter method resulted in a soft and pliable thread the knotting characteristics of which are excellent. The pliability is conveniently determined by forming a coil of the braided thread and squeezing opposite sides of the thread. The difference in pliability achieved is remarkable and easily detected by hand.

The threads used in Example I and the following examples comprise a plurality of slightly twisted fibres. Threads of a denier ranging from 30 to 100, specifically 30, 40, 70 and 100 denier, have been employed successfully.

Example II

Twelve threads of 40 denier polyethylene terephthalate were braided and hot stretched as in Example I as a control. The resultant braided thread was quite stiff.

Twelve additional threads of 40 denier polyethylene terephthalate were hot stretched and then braided as in Example I. The resultant braided thread was much more pliable then the control and the difference in pliability readily detected by squeezing coils of the threads.

Example III

Four threads of 100 denier polyethylene terephthalate were braided and hot stretched as in Example I as a control. The resultant braided thread was quite stiff.

Four additional threads of 100 denier polyethylene terephthalate were hot stretched and then braided as in Example I. The resultant braided thread was much more pliable than the control and the difference in pliability readily detected by sequeezing coils of the threads.

The number of individual components used to fabricate a braided thread has been successfully varied from 3 to 16. Specifically, 3, 4, 8, 12 and 16 component braided threads have been utilized.

While the above examples have been drawn to braided threads, the invention has utility in other component fabrics such as woven or knitted materials. Pliability of such materials has been determined to depend upon the sequences of the fabrication steps. Where the materials are hot stretched, the pliability thereof has been found to improve by hot-stretching the individual components thereof prior to braiding, knitting, weaving or otherwise interlacing the components into a material wherein those components cross or intersect. Thus, the invention is not limited to a process of braiding, but includes other knitting and weaving operations employing a hot-stretching step.

Lubricity of the thread may be modified as disclosed in my copending applications by coating the braided thread with the lubricating substances therein disclosed prior to interlacing the individual threads into a composite article.

For example, individual threads may be coated by passing each through a dispersion of minute particles of Teflon (polytetrafluoroethylene) dispersed in water either with or without a suitable wetting agent as is disclosed in my aforementioned copending applications, prior to being stretched in accordance with the present invention. The net result is to improve softness or pliability to at least a slight extent, to increase surface lubricity and to achieve the monofilamentous structure disclosed in my copending application Ser. No. 230,284. It is preferred, however, to lubricate the thread after braiding in the manner disclosed in my copending application Ser. No. 323,891 which method couples simplicity of operation with excellent coating and impregnation control. Another possibility is to coat individual fibres after stretching but prior to braiding. This alternative achieves thorough impregnation but is a bit more cumbersome than the convenient method of coating the stretched and braided material disclosed in my copending application Ser. No. 323,891.

In any event, the present invention provides a simple physical process for providing a markedly soft thread material and is clearly applicable to soften thread or fabric materials generally which are stretched at some time in their manufacture to eliminate or reduce elasticity of the finished article.

I claim:

1. A method of fabricating a pliable [material] *polyester thread* comprising the steps of providing a drafted filament[s], hot-stretching said drafted filament to reduce the elastic memory thereof, and subsequently [interlacing] *braiding* a plurality of said hot-stretched filaments into a composite [material] *thread*.

[2. A method according to claim 1 wherein the plurality of the hot-stretched fibers are braided.]

3. A method of fabricating a pliable braided polyester thread comprising the steps of providing a drafted polyester filament, hot-stretching said drafted filament at a temperature in the range of from glass transition temperature thereof to the softening point thereof to elongate the filament in the range of from a minimum of 20% based on its pre-stretched length, to just below the breaking point, and subsequently braiding a plurality of hot-stretched filaments into a braided thread.

4. A method according to claim 3 wherein the braided thread is sterilized.

5. A method according to claim 3 wherein the hot-stretched filaments are lubricated prior to braiding.

References Cited

The following references, cited by the Examiner, are of record in the patented file of this patent or the original patent.

UNITED STATES PATENTS

| | | | |
|---|---|---|---|
| 3,184,820 | 5/1965 | Kanbar | 28—71.3 |
| 3,139,741 | 7/1964 | Strub, Jr. | 66—125 A |
| 3,055,198 | 9/1962 | Burleson | 66—125 |

FOREIGN PATENTS

| | | | |
|---|---|---|---|
| 1,021,762 | 3/1966 | Great Britain | 57—140 R |

JOHN PETRAKES, Primary Examiner

U.S. Cl. X.R.

28—72 R; 57—157 S; 87—8; 264—103